United States Patent
Lee

(10) Patent No.: US 7,405,778 B2
(45) Date of Patent: Jul. 29, 2008

(54) LIQUID CRYSTAL DISPLAY AND FABRICATION METHOD THEREOF

(75) Inventor: Min Jic Lee, Daegu (KR)

(73) Assignee: LG Display Co., Ltd., Seoul (KR)

( * ) Notice: Subject to any disclaimer, the term of this patent is extended or adjusted under 35 U.S.C. 154(b) by 407 days.

(21) Appl. No.: 10/959,055

(22) Filed: Oct. 7, 2004

(65) Prior Publication Data

US 2005/0140852 A1    Jun. 30, 2005

(30) Foreign Application Priority Data

Dec. 30, 2003    (KR) .................... 10-2003-0099715

(51) Int. Cl.
*G02F 1/133*    (2006.01)
*G02F 1/1335*    (2006.01)
*G02F 1/1339*    (2006.01)

(52) U.S. Cl. ................... 349/73; 349/72; 349/106; 349/109; 349/190; 349/155; 349/158; 430/20

(58) Field of Classification Search ............ 349/73, 349/72, 106–109, 153, 158, 190, 155; 430/20
See application file for complete search history.

(56) References Cited

U.S. PATENT DOCUMENTS 5,847,785 A * 12/1998 Izumi .................... 349/73
6,067,071 A * 5/2000 Kotha et al. ............. 345/698
6,078,379 A * 6/2000 Nagae et al. ............. 349/155
6,341,862 B1 * 1/2002 Miyazaki et al. ......... 347/106
6,642,988 B2 * 11/2003 Matsuyama et al. ...... 349/156
6,759,660 B2 * 7/2004 Izumi et al. ........... 250/370.01

FOREIGN PATENT DOCUMENTS

| JP | 09-325328 | 12/1997 |
| JP | 10-197856 | 7/1998 |
| JP | 2003-270618 | 9/2003 |
| JP | 2005-196161 | 7/2005 |
| KR | 1019940009151 B1 | 10/1994 |

* cited by examiner

*Primary Examiner*—Huyen L. Ngo
(74) *Attorney, Agent, or Firm*—McKenna, Long & Aldridge LLP

(57) ABSTRACT

An LCD (Liquid Crystal Display) includes a first panel having a first resolution; a second panel having a second resolution, the second resolution lower than the first resolution; and a compensation pattern on an array substrate of the second panel for maintaining a cell gap. According to the present invention, though a color filter layer of the second panel having the lower resolution has a lower thickness, a uniform cell gap can be maintained.

5 Claims, 5 Drawing Sheets

Fig. 1A
Related Art
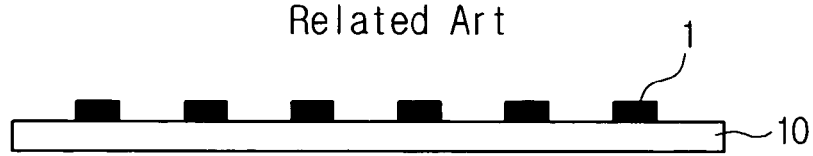
Fig. 1B
Related Art
Fig. 1C
Related Art
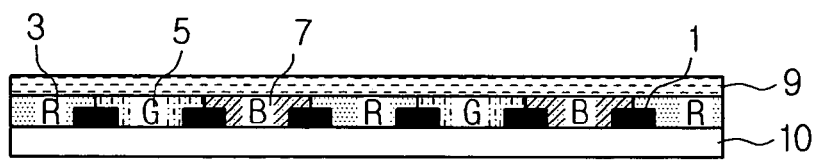
Fig. 2
Related Art
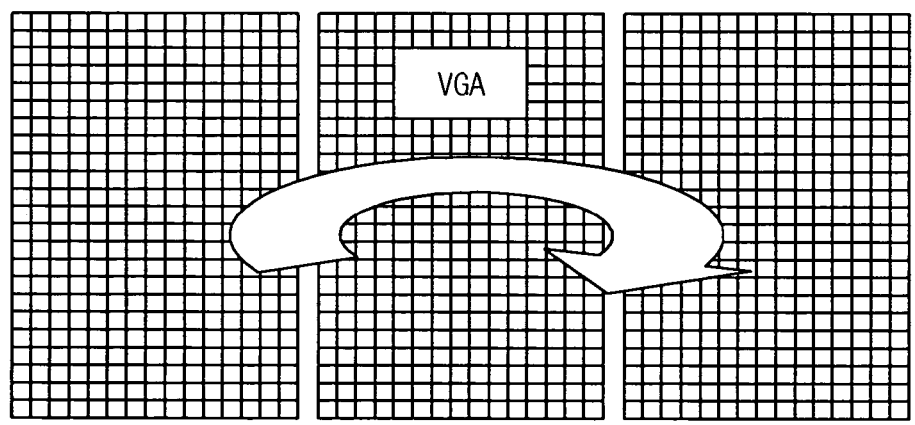
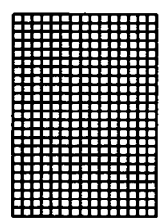
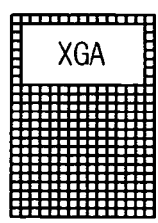
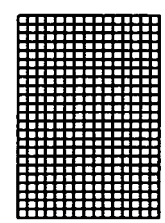

LIQUID CRYSTAL DISPLAY AND FABRICATION METHOD THEREOF

This application claims the benefit of Korean Patent Application No. 2003-99715, filed on Dec. 30, 2003, which is hereby incorporated by reference for all purposes as if fully set forth herein.

BACKGROUND OF THE INVENTION

1. Field of the Invention

The present invention relates to a liquid crystal display (LCD), and more particularly, to an LCD that can maintain a uniform cell gap, and a method of fabricating the same.

2. Discussion of the Related Art

Recently, researches on flat panel displays such as liquid crystal displays (LCDs), electro luminescence devices (ELDs), plasma display panels (PDPs), vacuum fluorescent displays (VFDs) and the like are in active progress. Among such flat panel displays, LCDs have such advantages as low voltage operation, low power consumption, lightweight and slim profile, full color realization. Therefore, the LCDs are widely used for a display for watches and calculators, computer monitors, monitors with a television receiving function, television sets, and hand-held terminals.

Such an LCD includes an array substrate having pixel electrodes formed thereon, a color filter substrate having a color filter layer and a common electrode formed thereon, and a liquid crystal layer interposed between the array substrate and the color filter substrate. An electric field is generated between the pixel electrodes and the common electrode, as a voltage is applied to the pixel electrodes and the common electrode. Liquid crystal molecules of the liquid crystal layer are aligned by the generated electric field to adjust light transmittance. By the adjustment of the light transmittance, light is converted into visible rays while passing through the color filter layer such that a desired image is displayed.

FIGS. 1A through 1C are sectional views illustrating a method for fabricating a color filter substrate according to a related art.

As shown in FIG. 1A, an opaque metal film such as chromium (Cr) having a low reflectivity is deposited on a transparent glass substrate 10 and is then patterned to form a black matrix layer 1. Alternatively, the black matrix layer 1 may be formed by coating a photosensitive black resin on the transparent glass substrate 10 and then exposing and etching the photosensitive black resin.

After the black matrix layer 1 is formed, a color filter layer including red, green and blue color filters 3, 5 and 7 is formed on the substrate 10 including the black matrix layer 1, as shown in FIG. 1B. The color filter layer is generally formed by a pigment dispersion method. In the pigment dispersion method, a photosensitive resist mixed with a prepared pigment is spin-coated, and the coated photosensitive resist is repeatedly exposed and developed to form the red color filter 3, the green color filter 5 and the blue color filter 7. For example, after a red photosensitive resist is spin-coated on the glass substrate 10, the coated red photosensitive resist is exposed and developed to form the red color filter 3. Next, a green photosensitive resist is spin-coated on the glass substrate 10, and the coated red photosensitive resist is exposed and developed to form the green color filter 5. Thereafter, a blue photosensitive resist is spin-coated on the glass substrate 10, and the coated red photosensitive resist is exposed and developed to form the blue color filter 7. By repeating the above steps, the color filter layer including the red color filter 3, the green color filter 5 and the blue color filter 7 is formed on the entire surface of the glass substrate 10.

After the color filter layer including the red color filter 3, the green color filter 5 and the blue color filter 7 is formed, a transparent resin having an insulating property is coated on the glass substrate 10 including the black matrix layer 1 and the color filter layer to form an overcoat layer 9, thereby planarizing the black matrix layer 1 and the color filter layer, as shown in FIG. 1C. After that, although not shown in FIG. 1C, a common electrode for applying a common voltage is formed on the overcoat layer 9.

FIG. 2 is a schematic plan view of a color filter substrate for a multi-model on glass (MMG) model.

The MMG model includes a plurality of panels having different resolutions on a single glass substrate. As one example of the MMG model, a VGA panel and an XGA panel are provided on a glass substrate, as shown in FIG. 2. A black matrix layer structure and a thickness of a color filter layer in the XGA panel are different from those in the VGA panel. Also, because the VGA panel has a pixel size larger than the XGA panel, the resolution of the VGA panel is lower than that of the XGA panel. Thus, because the MMG model LCD is provided with two panels having different resolutions together on a single glass substrate, it has an advantage of maximizing use efficiency of the glass substrate.

In the MMG model LCD, the color filter layer is, however, formed by a spin-coating method. Accordingly, an interval between the lattices of the black matrix layer of the XGA panel becomes different from that of the VGA panel. The difference in the intervals of the lattices between the XGA panel and the VGA panel raises a problem in that the thicknesses of the color filters formed between the lattices of the black matrix layer are different.

FIG. 3 is a schematic view illustrating a non-uniform cell gap between a XGA panel and a VGA panel in a MMG model LCD.

As shown in FIG. 3, the MMG model LCD is provided with panels having different resolutions. For this purpose, a color resist is coated on each of the panels by a spin coating method. When the color resist is spin-coated, the color resist spreads on a black matrix layer. As aforementioned, the intervals between the lattices of the black matrix layers formed on the panels having different resolutions are different. The different intervals cause the coated color resist to spread at a different spreading rate, so that the thicknesses of the color filters formed varies depending on the location. In other words, the thicknesses of the color filters of the XGA panel is greater than that of the color filters of the VGA panel. This indicates that the thickness of the color filter substrate of the XGA panel is greater than that of the color filter substrate of the VGA panel. Because of the difference in the thicknesses of the color filters of each of the panels having a different resolution, the cell gaps of the VGA panel and the XGA panel in the MMG model LCD is not uniform, as illustrated in FIG. 3.

To solve the above problem, it is suggested to disperse ball spacers when the array substrate and the color filter substrate are attached to each other or to arrange column spacers at a non-transmission region of the array substrate. However, these methods do not solve the above problem satisfactorily. The non-uniform cell gap causes a difference in optical path, so that picture quality deteriorates.

SUMMARY OF THE INVENTION

Accordingly, the present invention is directed to an LCD and fabrication method thereof that substantially obviates one or more problems due to limitations and disadvantages of the related art.

An advantage of the present invention is to provide a multi-model on glass (MMG) model LCD having panels with different resolutions and fabrication method thereof in which a compensation pattern is formed on an array substrate at a region having a relatively lower thicknesses of the color filters, thereby maintaining a uniform cell gap.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an LCD (Liquid Crystal Display) includes a first panel having a first resolution; a second panel having a second resolution, the second resolution lower than the first resolution; and a compensation pattern on an array substrate of the second panel for maintaining a cell gap.

The compensation pattern may be formed on a gate bus line of the array substrate.

The compensation pattern may be formed on the same layer as an active layer of the array substrate.

The compensation pattern may include the same material as an active layer of the array substrate.

The compensation pattern may be formed on the same layer as a source/drain electrode of the array substrate.

The compensation pattern may include the same material as a source/drain electrode of the array substrate.

According to another aspect of the present invention, a method of fabricating an LCD including a first panel and a second panel having different resolutions, the method includes forming a gate electrode and a gate bus line on a first substrate of the first panel and a second substrate of the second panel; forming a gate insulating layer on the first and second substrates including the gate bus line; forming an active layer including a channel layer and an ohmic contact layer on the first and second substrates including the gate insulating layer, and at the same time forming a compensation pattern on the first substrate of the first panel; forming a source/drain electrode and a data bus line on the first and second substrates including the active layer; and forming a pixel electrode on the first and second substrates including the source/drain electrode.

According to a further aspect of the present invention, a method of fabricating an LCD including a first panel and a second panel having different resolutions, the method includes forming a gate electrode and a gate bus line on a first substrate of the first panel and a second substrate of the second panel; forming a gate insulating layer on the first and second substrates including the gate bus line; forming an active layer including a channel layer and an ohmic contact layer on the first and second substrates including the gate insulating layer; forming a source/drain electrode and a data bus line on the first and second substrates including the active layer and at the same time forming a compensation pattern on the first substrate of the first panel; and forming a pixel electrode on the first and second substrates including the source/drain electrode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings:

FIGS. 1A through 1C are sectional views illustrating a method for fabricating a color filter substrate according to a related art;

FIG. 2 is a schematic plan view of a color filter substrate for a multi-model on glass (MMG) model;

DETAILED DESCRIPTION OF THE ILLUSTRATED EMBODIMENTS

Reference will now be made in detail to the preferred embodiments of the present invention, examples of which are illustrated in the accompanying drawings.

Figure 3:
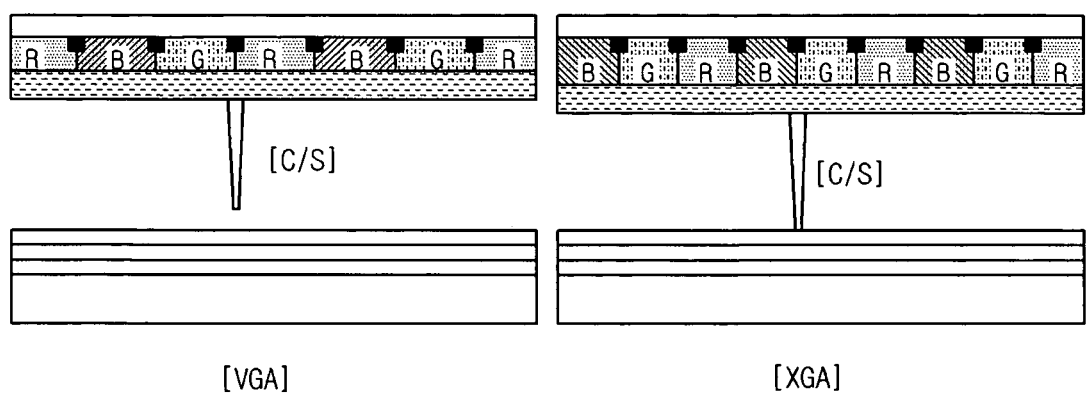
FIG. 3 is a schematic view illustrating a non-uniform cell gap between a XGA panel and a VGA panel in a MMG model LCD.
Figure 4:
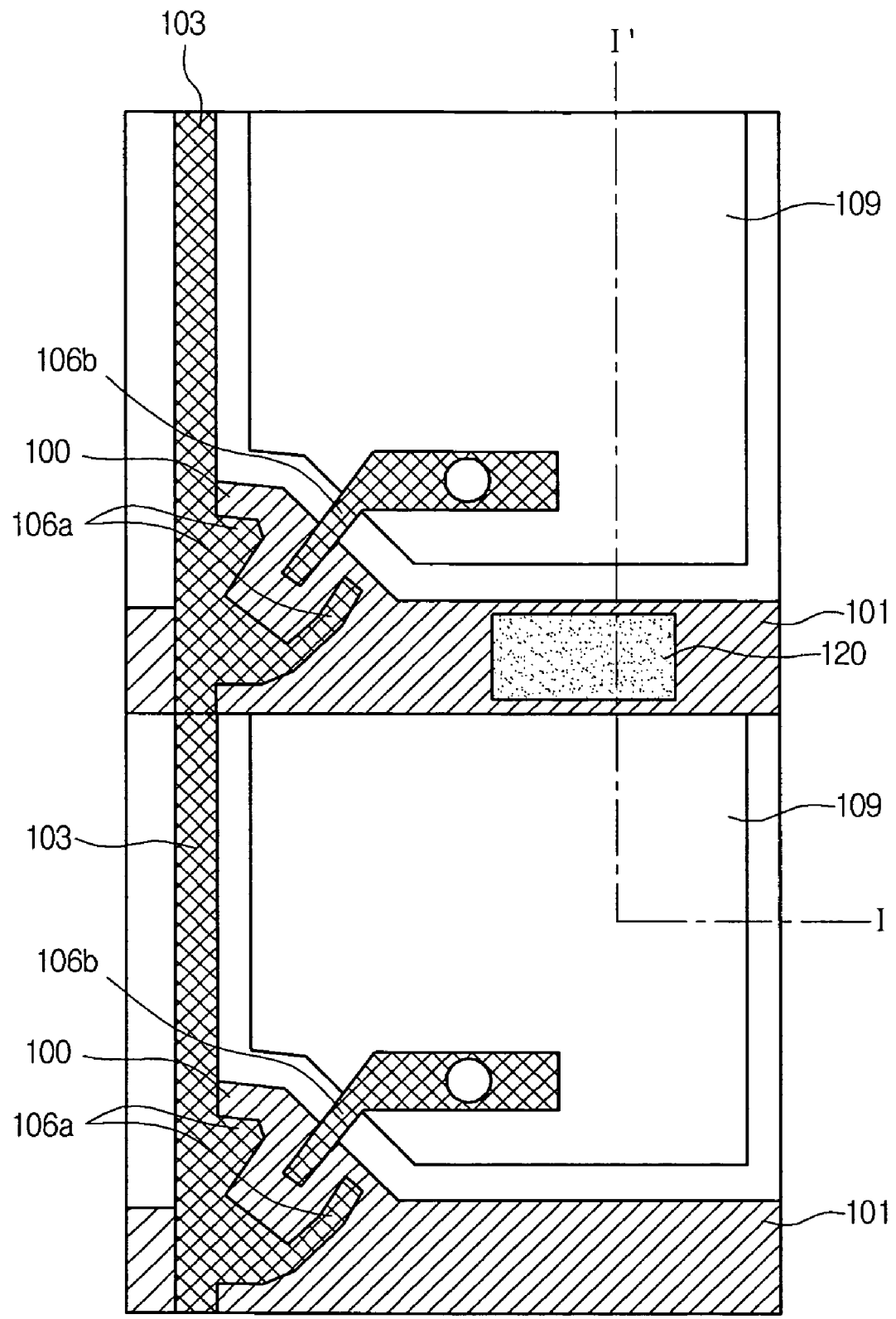
FIG. 4 is a schematic view illustrating a pixel structure of an MMG model LCD according to an embodiment of the present invention.

FIG. 4 is a schematic view illustrating a pixel structure of an MMG model LCD according to an embodiment of the present invention.

The MMG model LCD is provided on a single glass substrate with a VGA panel and an XGA panel having different resolutions. Each of the VGA panel and the XGA panel is configured to include an array substrate, a color filter substrate, and a liquid crystal layer between the array substrate and the color filter substrate. Resolution is generally determined by the size of R, G and B color filters arranged in a matrix configuration on the color filter substrate. Thus, the color filters of the VGA panel having a relatively lower resolution have a size larger than the color filters of the XGA panel having a relatively higher resolution. Because the color filters are formed by a spin-coating method, the thicknesses of the color filters varies depending on the size of the color filters. In other words, the thicknesses of the color filters of the XGA panel is greater than the thicknesses of the color filters of the VGA panel. Due to the difference in the thicknesses of the color filters between the VGA panel and the XGA panel having different resolutions, the cell gap between the array substrate and the color filter substrate is not uniform, when the array substrate and the color filter substrate are attached to each other, as explained in the previous section.

In the present invention, a compensation pattern 120 is provided on an array substrate of a VGA panel to compensate for the cell gap difference between the VGA and XGA panels, thereby maintaining a uniform cell gap. An array substrate of a VGA panel in the MMG model LCD according to an embodiment of the present invention is illustrated in FIG. 4.

As shown in FIG. 4, a unit pixel region is defined by a crossing point of a data bus line 103 and a gate bus line 101. A thin film transistor and a pixel electrode 109 are arranged within the unit pixel region. The thin film transistor includes a gate electrode 100, source and drain electrodes 106a and 106b, and an active layer between the gate electrode 100 and the source and drain electrodes 106a and 106b. The gate electrode 100 is connected with the gate bus line 101, the source electrode 106a is connected with the data bus line 103, and the drain electrode 106b is connected with the pixel electrode 109. Accordingly, the thin film transistor is turned on by a gate signal applied via the gate bus line 101 and a data signal applied via the data bus line 103, and the data signal is applied to the pixel electrode 109 through the turned-on thin film transistor.

In the present invention, to prevent unbalance in the cell gap due to a difference in the thicknesses of the color filters of the panels having different resolutions, the compensation pattern 120 is provided on the gate bus line 101. The compensation pattern 120 is formed to have a rectangular shape. However, it should be understood that the compensation pattern 120 may be formed to have a triangular shape, a circular shape, a polygonal shape, or the like. The compensation pattern 120 may be made of the same material as the active layer or the source/drain electrode 106a and 106b. Thus, by forming the compensation pattern 120 on the gate bus line 101 on the array substrate of the VGA panel, the non-uniform cell gap between the VGA panel and the XGA panel is compensated, thereby maintaining a uniform cell gap throughout an entire area of the MMG model LCD.

Figure 5:
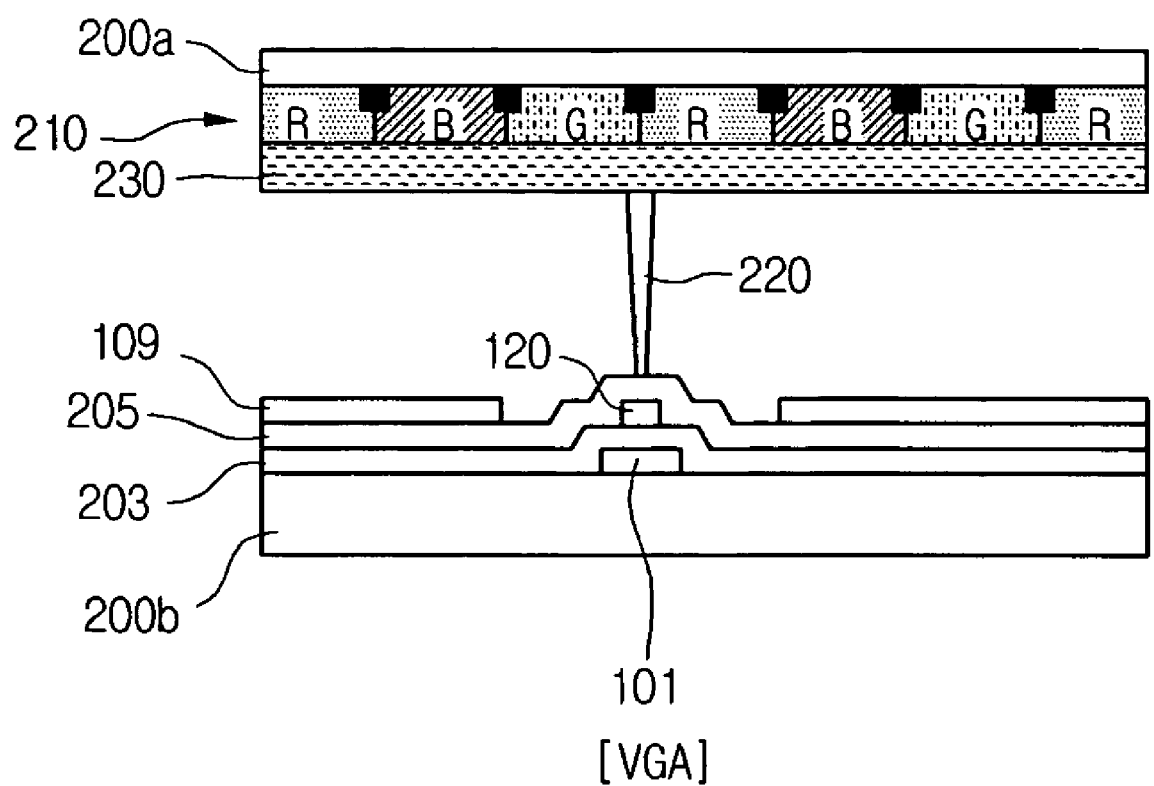
FIG. 5 is a cross-sectional view of I-I' line in a pixel structure of an MMG model LCD of FIG. 4.

FIG. 5 is a cross-sectional view of I-I' line in a pixel structure of an MMG model LCD of FIG. 4.

The MMG model LCD is provided on a single glass substrate with a VGA panel and an XGA panel. As shown in FIG. 5, a thickness of a color filter layer 210 formed on a color filter substrate 200a in a VGA panel is relatively smaller than that of a color filter layer formed on a color filter substrate in an XGA panel. To this end, a compensation pattern 120 is formed on an array substrate 200b corresponding to the color filter layer 210 of the color filter substrate 200a. Due to the compensation pattern 120, a cell gap between the color filter substrate 200a and the array substrate 200b is uniformly maintained. If the compensation pattern 120 is not formed in the VGA panel, one end of a column spacer 220 may not be in contact with the array substrate 200b. If such a case occurs, the column spacer 220 fails to maintain a uniform cell gap. When an active layer or a source/drain electrode is formed during a fabrication process of the array substrate 200b, the compensation pattern 120 can be formed concurrently with either the active layer or the source/drain electrode.

Still referring to FIG. 5, a gate metal film is deposited on the array substrate 200b and is then patterned to form the gate electrode and the gate bus line 101. Thereafter, a gate insulating layer 203 is formed on an entire surface of the array substrate 200b including the gate electrode and the gate bus line 101. Next, a non-doped amorphous silicon film and an impurity-doped amorphous silicon film are deposited on the gate insulating layer 203 and are then patterned to form an active layer having a channel layer and an ohmic contact layer. At this time, in order to compensate for a difference in the thickness of the color filter layer 210 in the color filter substrate 200a of the VGA panel compared with the XGA panel, the compensation pattern 120 is formed on the gate bus line 101. The compensation pattern 120 is formed concurrently with the active layer. Accordingly, the thickness of the compensation pattern 120 is the same as that of the active layer, and is in a range of 1-1.5 μm. As a result, the region where the compensation pattern 120 is formed is protruded and is higher than other regions. When the column spacer 220 is placed on the protruded region, the column spacer 220 is in contact with the protruded region due to the height compensation of 1-1.5 μm, thereby maintaining a uniform cell gap.

Next, a source/drain metal film is deposited on the array substrate 200b including the active layer and is then patterned to form the source/drain electrode and the data bus line. A passivation layer 205 is formed on an entire surface of the array substrate 200b including the data bus line, and is then patterned to form a contact hole. Thereafter, a transparent conductive film such as ITO is deposited on the passivation layer 205 including the contact hole and is then patterned to form a pixel electrode. The pixel electrode is connected with the drain electrode through the contact hole of the passivation layer 205. Then, an overcoat layer of a transparent insulating material may be formed on the array substrate 200b including the pixel electrode so as to planarize an upper surface of the array substrate 200b.

In a modification of the present invention, the compensation pattern 120 may be formed concurrently with the source/drain electrode, not concurrently with the active layer. In other words, when a source/drain metal film is deposited and patterned to form the source/drain electrode on the array substrate 200b including the active layer, the compensation pattern 120 can be formed of the same material as the source/drain electrode on the gate bus line 101. The source/drain electrode is formed to have a thickness ranging from 2 μm to 2.5 μm, which is relatively thicker than the thickness of the active layer. Thus, when the compensation pattern 120 is made of the same material as the source/drain electrode and the column spacer 220 is placed on the compensation pattern 120, it is possible to compensate for a height difference ranging from 2 μm to 2.5 μm. In FIG. 5, non-described reference numeral 230 indicates an overcoat layer on the color filter substrate 200a.

Figure 6:
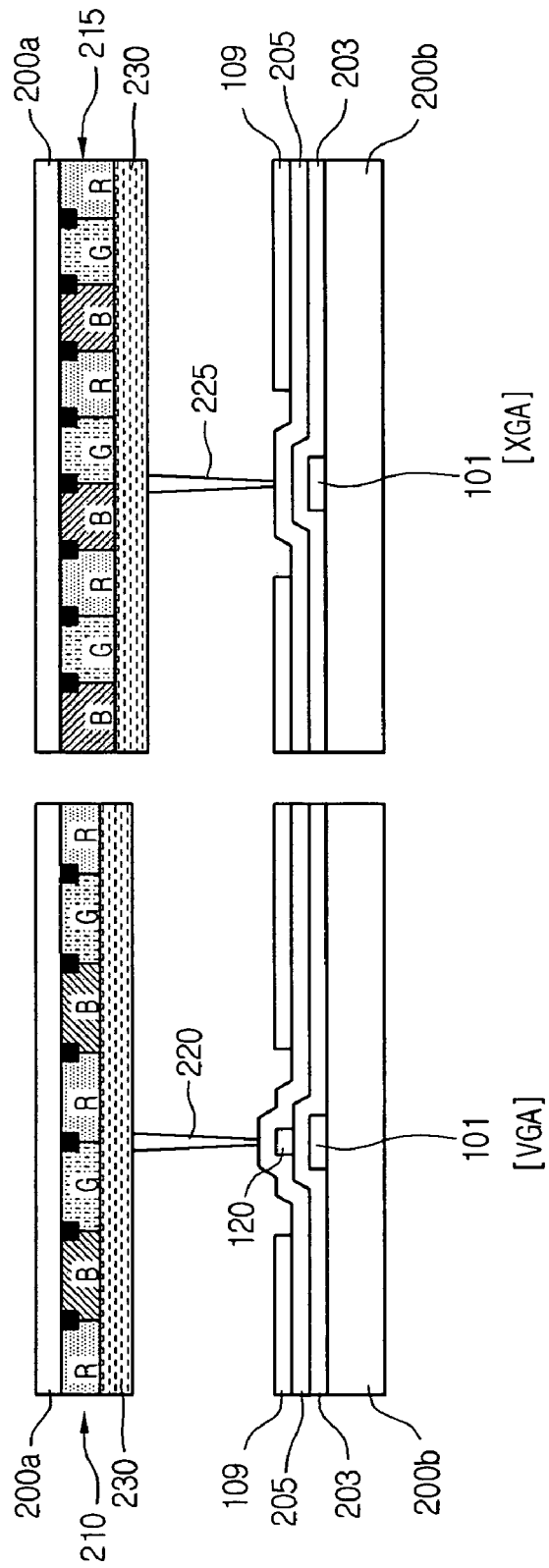
FIG. 6 is a schematic view illustrating a construction for maintaining a uniform cell gap in an MMG model LCD having a VGA panel and an XGA panel according to an embodiment of the present invention.

FIG. 6 is a schematic view illustrating a construction for maintaining a uniform cell gap in an MMG model LCD having a VGA panel and an XGA panel according to an embodiment of the present invention.

As shown in FIG. 6, the MMG model LCD is provided with a VGA panel and an XGA panel. Color filter layers 210 and 215 and an overcoat layer 230 are formed on color filter substrates 200a of the VGA panel and the XGA panel, and a gate bus line 101, a gate insulating layer 203 and a passivation layer 205 are formed on array substrates 200b of the VGA panel and the XGA panel.

As aforementioned, the thickness of the color filter layer 210 of the VGA panel is smaller than that of the color filter layer 215 of the XGA panel. A height of a column spacer 220 of the VGA panel is the same as that of a column spacer 225 of the XGA panel. Assuming that a compensation pattern 120 is not provided on the VGA panel, one end of the column spacer 220 of the VGA panel is not in contact with an upper surface of the array substrate 200b due to a difference in the thicknesses of the color filter layers 210 and 215 between the VGA panel and the XGA panel. Thus, the cell gap of the MMG model LCD is not uniformly maintained. To compensate for such a non-uniform cell gap between the VGA panel and the XGA panel, the compensation pattern 120 is formed in the VGA panel. More exactly, the compensation pattern 120 is formed on the gate bus line 101 of the array substrate 200b of the VGA panel.

From experiments, it is confirmed that the thickness of the color filter layer 215 of the XGA panel having a relatively higher resolution is greater than that of the color filter layer 210 of the VGA panel having a relatively lower resolution. Thus, by forming the compensation pattern 120 on the array substrate 200b of the VGA panel provided with the color filter layer 210 having a relatively smaller thickness, a cell gap of the MMG model LCD can be uniformly maintained. In other words, the MMG model LCD of the present invention is designed such that the XGA panel provided with the relatively thicker color filter layer 215 maintains the cell gap using the array substrate 200b and the column spacer 225, whereas the VGA panel provided with the relatively thinner color filter layer 210 maintains the cell gap using the compensation pattern 120 formed on the array substrate 220b as well as the array substrate 200b and the column spacer 220.

As described above, according to the present invention, in an MMG model LCD provided with panels having different resolutions, a compensation pattern for compensating for a difference in thickness of the color filter layer between the panels is formed on an array substrate, thereby maintaining a uniform cell gap. Also, because the compensation pattern is formed concurrently with the active layer or the source/drain electrode, an additional process is not required.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of fabricating an LCD including a first panel and a second panel having different resolutions, the method comprising:

forming a gate electrode and a gate bus line on a first substrate of the first panel and a second substrate of the second panel;

forming a gate insulating layer on the first and second substrates including the gate bus line;

forming an active layer including a channel layer and an ohmic contact layer on the first and second substrates including the gate insulating layer;

forming a source/drain electrode and a data bus line on the first and second substrates including the active layer, and at the same time forming a compensation pattern on the first substrate of the first panel; and forming a pixel electrode on the first and second substrates including the source/drain electrode.

2. The method according to claim 1, wherein the first panel has a first resolution that is lower than a second resolution of the second panel.

3. The method according to claim 1, wherein the compensation pattern is formed on the same layer as a source/drain electrode.

4. The method according to claim 1, wherein compensation pattern includes the same material as a source/drain electrode.

5. The method according to claim 1, wherein the compensation pattern is formed to have one of rectangular, circular, triangular and polygonal shapes.

* * * * *